United States Patent

Chen et al.

(10) Patent No.: US 9,921,695 B2
(45) Date of Patent: Mar. 20, 2018

(54) TOUCH DEVICE

(71) Applicant: INDUSTRIAL TECHNOLOGY RESEARCH INSTITUTE, Hsinchu (TW)

(72) Inventors: Sin-An Chen, Yuanlin Township (TW); Chih-Chia Chang, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 317 days.

(21) Appl. No.: 14/803,875

(22) Filed: Jul. 20, 2015

(65) Prior Publication Data
US 2016/0266670 A1    Sep. 15, 2016

(30) Foreign Application Priority Data

Mar. 12, 2015 (TW) .............................. 104203689 U

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ............................... G06F 3/044; G06F 3/0412
See application file for complete search history.

(56) References Cited

U.S. PATENT DOCUMENTS

| 8,199,127 | B2 | 6/2012 | Mamba et al. |
| 8,243,027 | B2 | 8/2012 | Hotelling et al. |
| 8,493,345 | B2 | 7/2013 | Anno |
| 8,508,495 | B2 | 8/2013 | Hotelling et al. |
| 8,576,161 | B2 | 11/2013 | Chang et al. |
| 2010/0265193 | A1* | 10/2010 | Kung ............... G06F 3/044 345/173 |
| 2013/0321292 | A1 | 12/2013 | Jeon |
| 2017/0205917 | A1* | 7/2017 | Yamaoka ............... B32B 7/02 |

FOREIGN PATENT DOCUMENTS

| CN | 101894856 A | 11/2010 |
| CN | 103513837 A | 1/2014 |
| TW | I403946 B | 8/2013 |

OTHER PUBLICATIONS

Ahn et al., "Characteristics of ITO-resistive touch film deposited on a PET substrate by in-line DC magnetron sputtering", Vacuum, vol. 101, 2014, pp. 221-227.

Chang-Jian et al., "Fabrication of transparent double-walled carbon nanotubes flexible matrix touch panel by laser ablation technique", Optics & Laser Technology, vol. 43, 2011, pp. 1371-1376.

(Continued)

*Primary Examiner* — Lisa Landis
(74) *Attorney, Agent, or Firm* — Birch, Stewart, Kolasch & Birch, LLP

(57) ABSTRACT

A touch device is provided. The touch device includes a first insulating layer, a first sensing electrode layer, a second insulating layer, and a second sensing electrode layer. The first sensing electrode layer is located on the first insulating layer. The second insulating layer is located on the first sensing electrode layer. The second sensing electrode layer is located on the second insulating layer.

11 Claims, 9 Drawing Sheets

(56) References Cited

OTHER PUBLICATIONS

Kim et al., "Capacitive tactile sensor array for touch screen application", Sensors and Actuators A: Physical, vol. 165, 2011, pp. 2-7.
Lee et al., "In-cell adaptive touch technology for a flexible e-paper display", Solid-State Electronics, vol. 56, 2011, pp. 159-162.
Shin et al., "Resistance and transparency tunable Ag-inserted transparent InZnO films for capacitive touch screen panels", Thin Solid Films, vol. 548, 2013, pp. 641-645.
Tai et al., "Active matrix touch sensor detecting time-constant change implemented by dual-gate IGZO TFTs", Solid-State Electronics, vol. 72, 2012, pp. 67-72.

* cited by examiner

TOUCH DEVICE

This application claims the benefit of Taiwan application Serial No. 104203689, filed Mar. 12, 2015, the disclosure of which is incorporated by reference herein in its entirety.

TECHNICAL FIELD

The disclosure relates to a touch device.

BACKGROUND

A touch panel, which is an information input device newly invented in recent years, has the advantages of portability and user-friendly operation. Based on the sensing principles, the touch panel can be divided into following four types: the optical type, the acoustic type, the capacitive type, and the resistive type. The electrodes of the touch structure of the capacitive touch panel are formed of patterned transparent conducting films. When the panel is touched by a finger, capacitance generated between the electrodes will change accordingly. The movement of the finger can be determined according to the change of capacitance, and whether the surface of the touch panel is touched by a finger or a conducting object can be determined by detecting the variation of capacitance.

A touch panel is formed from a touch structure and a display panel. As the touch panel is directed towards thin design, the distance between the touch structure and the display panel is getting smaller and smaller. However, if the touch structure and the display panel are too close to each other, the internal electrodes of the display panel may easily affect the touch signal and weaken the touch signal, and even make the touch sensing function fail.

SUMMARY

According to one embodiment, a touch device is provided. The touch device includes a first insulating layer, a first sensing electrode layer, a second insulating layer and a second sensing electrode layer. The first sensing electrode layer is disposed on the first insulating layer. The second insulating layer is disposed on the first sensing electrode layer. The second sensing electrode layer is disposed on the second insulating layer. The first sensing electrode layer is a transmitter electrode. The second sensing electrode layer is a receiver electrode. The first insulating layer has a thickness of 0.01-75 micrometers ($\mu m$). Both the first sensing electrode layer and the second sensing electrode layer have a thickness of 20-200 nanometers (nm).

According to another embodiment, a touch device is provided. The touch device includes a first insulating layer, a first sensing electrode layer, a second insulating layer and a second sensing electrode layer. The first sensing electrode layer includes a first portion and a second portion, wherein the first portion is disposed on the first insulating layer. The second insulating layer is disposed on the first portion of the first sensing electrode layer. The second sensing electrode layer is disposed on the second insulating layer, wherein the second sensing electrode layer is coplanar with the second portion of the first sensing electrode layer.

The above and other aspects of the disclosure will become better understood with regard to the following detailed description of the preferred but non-limiting embodiment(s). The following description is made with reference to the accompanying drawings.

DETAILED DESCRIPTION

According to the embodiments of the present disclosure, the first sensing electrode layer of the touch device is disposed between the electrode layer and the second sensing electrode layer to reduce the sensing capacitance generated between the second sensing electrode layer and the electrode layer and avoid the touch sensing signal from being too week to activate the touch sensing function, so that the touch sensitivity can be improved. The embodiments of the present disclosure are described below with reference to accompanying drawings. Detailed structures and components disclosed in the embodiments are for explanatory and exemplary purposes only, not for limiting the scope of protection of the present disclosure. A person ordinarily skilled in the art shall be able to make necessary modifications or variations according to actual implementation of the present disclosure.

Figure 1A:
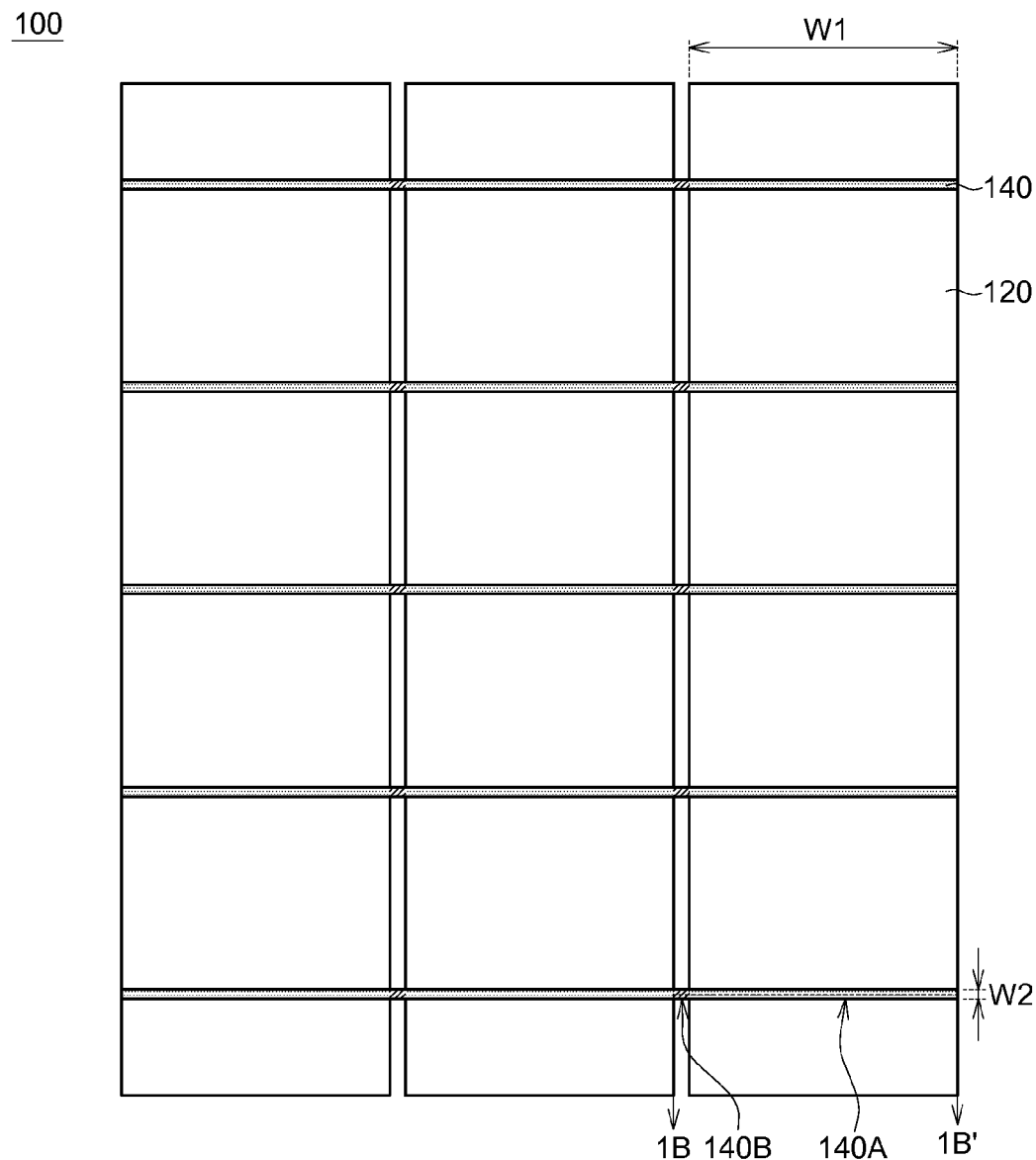
FIG. 1A is a top view of a touch device according to an embodiment of the present disclosure.
Figure 1B:
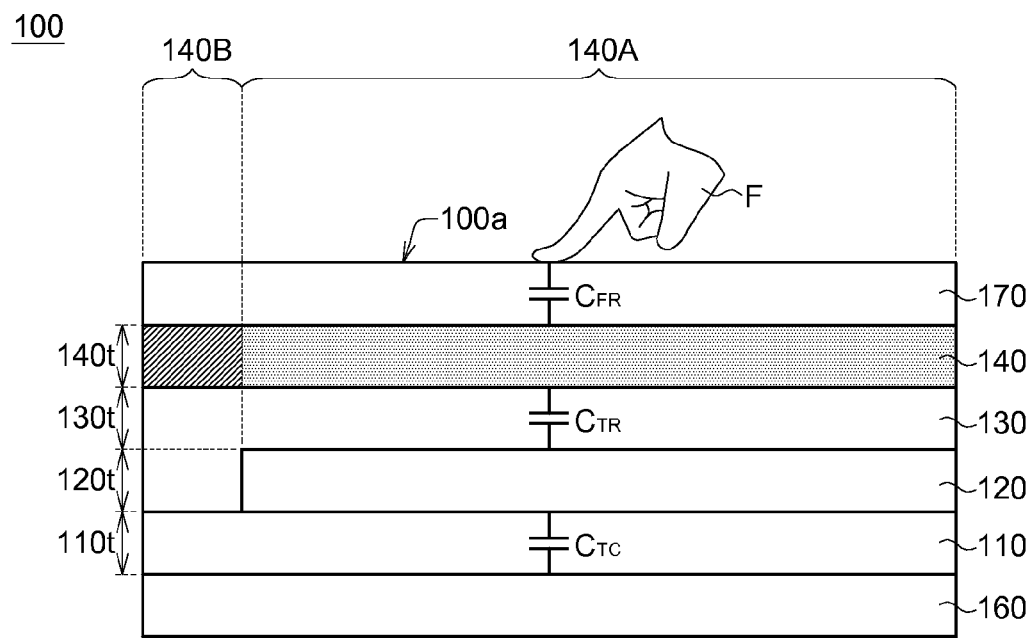
FIG. 1B is a cross-sectional view of the touch device of FIG. 1A along a cross-sectional line 1B-1B'.

FIG. 1A is a top view of a touch device 100 according to an embodiment of the present disclosure. FIG. 1B is a cross-sectional view of the touch device of FIG. 1A along a cross-sectional line 1B-1B'. As indicated in FIG. 1A-1B, the touch device 100 includes a first insulating layer 110, a first sensing electrode layer 120, a second insulating layer 130 and a second sensing electrode layer 140. The first sensing electrode layer 120 is disposed on the first insulating layer 110. The second insulating layer 130 is disposed on the first sensing electrode layer 120. The second sensing electrode layer 140 is disposed on the second insulating layer 130.

In the embodiment, the first insulating layer 110, the first sensing electrode layer 120, the second insulating layer 130 and the second sensing electrode layer 140 can form a touch module. The first sensing electrode layer 120 can be realized by a transmitter electrode. The second sensing electrode layer 140 can be realized by a receiver electrode. In the embodiment, the first sensing electrode layer 120 and the second sensing electrode layer 140 both include a transparent conductive material, such as indium tin oxide (ITO).

In the embodiment as indicated in FIG. 1A, the first sensing electrode layer 120 and the second sensing electrode layer 140 both include a plurality of electrode strips. The electrode strips in the first sensing electrode layer 120 and the electrode strips in the second sensing electrode layer 140 are substantially orthogonal to each other to form a mesh structure. In the embodiment as indicated in FIG. 1A, each electrode strip of the first sensing electrode layer 120 has a width W1, each electrode strip of the second sensing electrode layer 140 has a width W2, and the width W1, for example, is larger than the width W2.

According to the embodiments of the present disclosure, as shown in FIG. 1B, when a finger F touches a surface 100a of the touch device 100, the finger F itself is a conductor as well. Therefore, a sensing capacitance $C_{FR}$ is generated between the finger F and the second sensing electrode layer 140 (receiver electrode), and a sensing capacitance $C_{TR}$ is generated between the first sensing electrode layer 120 (transmitter electrode) and the second sensing electrode layer 140 (receiver electrode). Then, the touch device 100 will have sensing signals $C_{FR}/C_{TR}$, and can operate smoothly.

In the embodiment as indicated in FIG. 1B, the thickness 110t of the first insulating layer 110 is such as 0.01-75 micrometers (μm), the thickness 130t of the second insulating layer 130 is such as 100 nanometers (nm)-10 μm, and the thickness 120t of the first sensing electrode layer 120 and the thickness 140t of the second sensing electrode layer 140 are such as 20-200 nm.

In a conventional approach, the touch module is bonded by an optical glue having a thickness of 100-150 μm. In comparison, the first insulating layer 110 according to the embodiments of the present disclosure has a thickness 110t of only 0.01-75 μm, for example, about 25 μm, such that the touch device with a thin design can be achieved. Moreover, since a thin touch device is more flexible, the touch device with a flexible design can be further achieved.

In the embodiment as indicated in FIG. 1B, the touch device 100 may further include an electrode layer 160. The first insulating layer 110 is disposed between the electrode layer 160 and the first sensing electrode layer 120. In other words, the first insulating layer 110 is disposed on the electrode layer 160.

In the embodiment, the touch device 100 can be realized by a touch display device, and the electrode layer 160 can be realized by a pixel electrode layer, or an upper electrode layer of an organic light emitting diode (OLED) display module. In other words, the touch device 100 may include a touch module and a display module, and the touch module may include the first insulating layer 110, the first sensing electrode layer 120, the second insulating layer 130 and the second sensing electrode layer 140. The electrode layer 160 can be realized by a pixel electrode layer or a reference electrode of the liquid crystal display module, or an upper electrode layer, a lower electrode layer or the upper/lower electrode layer of the OLED display module.

According to the embodiments of the present disclosure, as shown in FIG. 1B, when the finger F touches the surface 100a of the touch device 100, apart from the sensing capacitance $C_{FR}$ generated between the finger F and the second sensing electrode layer 140 (receiver electrode) and the sensing capacitance $C_{TR}$ generated between the first sensing electrode layer 120 (transmitter electrode) and the second sensing electrode layer 140 (receiver electrode), a sensing capacitance $C_{TC}$ is generated between the first sensing electrode layer 120 (transmitter electrode) and the electrode layer 160. Then, the touch device 100 will have sensing signals $C_{FR}/(C_{TR}+C_{TC})$ and can operate smoothly.

In a conventional touch device, the transmitter electrode and the receiver electrode are coplanar with each other, and these two electrodes are separated from the electrode of the display module by an insulating layer and by the same distance. When the distance from the transmitter electrode and the receiver electrode to the electrode of the display module is reduced, that is, when the thickness of the insulating layer between the transmitter electrode and the receiver electrode and the electrode of the display module is reduced, the electrical field between the receiver electrode and the electrode of the display module may be interfered with. Apart from the sensing capacitance $C_{FR}$ generated between the finger F and the receiver electrode, the sensing capacitance $C_{TR}$ generated between the transmitter electrode and the receiver electrode, and the sensing capacitance $C_{TC}$ generated between the transmitter electrode and the electrode of the display module, the sensing capacitance $C_{RC}$ will also be generated between the receiver electrode and the electrode of the display module. Then, the touch device 100 will have sensing signals $C_{FR}/(C_{TR}+C_{TC}+C_{RC})$. Under such circumstance, the sensing signals may become too weak and cause the touch sensitivity to deteriorate or even may become too weak and incapacitate the normal operation of the touch device.

According to the embodiments of the present disclosure, as shown in FIG. 1B, the first sensing electrode layer 120 (transmitter electrode) is not coplanar with the second sensing electrode layer 140 (receiver electrode), and the first sensing electrode layer 120 (transmitter electrode) is disposed between the electrode layer 160 (the electrode layer of the display module) and the second sensing electrode layer 140 (receiver electrode), reducing the sensing capacitance generated between the second sensing electrode layer 140 (receiver electrode) and the electrode layer 160 (the electrode layer of the display module), and only the first sensing electrode layer 120 (transmitter electrode) and the electrode layer 160 (the electrode layer of the display module) will generate the sensing capacitance $C_{TC}$. Therefore, even when the thickness 110t of the first insulating layer 110 is only 0.01-75 μm, the touch sensing signals will not be too weak to activate the touch sensing function, so that the touch sensitivity can be improved. In other words, according to the embodiments of the present disclosure, a thin and flexible touch device is provided while achieving excellent touch sensing effects.

In the embodiment as indicated in FIGS. 1A-1B, the second sensing electrode layer 140 has a first region 140A and a second region 140B. The first region 140A overlaps the first sensing electrode layer 120, but the second region 140B does not overlap the first sensing electrode layer 120. As indicated in FIG. 1B, a portion of the second insulating layer 130 is disposed between the first region 140A of the second sensing electrode layer 140 and the first sensing electrode layer 120, and the other portion of the second insulating layer 130 is disposed between the second region 140B of the second sensing electrode layer 140 and the first insulating layer 110.

In the embodiment, the ratio of the area of the first region 140A of the second sensing electrode layer 140 with respect to the total area of the first region 140A and the second region 140B of the second sensing electrode layer 140 is 90-99.5%. In other words, the ratio of the area of the second region 140B of the second sensing electrode layer 140 with respect to the area of the first region 140A is 0.5-10%.

In some embodiments, the first insulating layer 110 of the touch device 100 can be realized by an adhering layer, and the first sensing electrode layer 120 is bonded to the electrode layer 160 by the adhering layer (first insulating layer 110). The adhering layer can be realized by such as a pressure sensing adhesive (PSA) or an optical clear adhesive (OCA). For example, the touch device 100 can be realized by a touch display device, wherein the touch module is bonded to the display module by an adhering layer (first insulating layer 110). Since the thickness 110t of the first insulating layer 110 is only 0.01-75 µm, a thin touch device can thus be achieved.

In some embodiments, the first insulating layer 110 of the touch device 100 further includes an insulating protection layer and an adhering layer (not illustrated in the drawings), wherein the adhering layer is disposed on the insulating protection layer. For example, the touch device 100 can be realized by a touch display device. The display module and the touch module are manufactured separately. The insulating protection layer is used as a protection layer of the display module and covers the electrode layer 160. The first sensing electrode layer 120 is bonded to the insulating protection layer outside the electrode layer 160 by an adhering layer. That is, the touch module is bonded to the display module by the adhering layer (first insulating layer 110). Since the total thickness 110t of the insulating protection layer and the adhering layer of the first insulating layer 110 is only 0.01-75 µm, a thin touch device can thus be achieved.

In the embodiment as indicated in FIG. 1B, the touch device 100 further includes a covering layer 170 disposed on the second sensing electrode layer 140. In the embodiment, the covering layer 170 can be realized by an insulating protection layer formed of glass and used for covering the second sensing electrode layer 140.

Figure 2A:
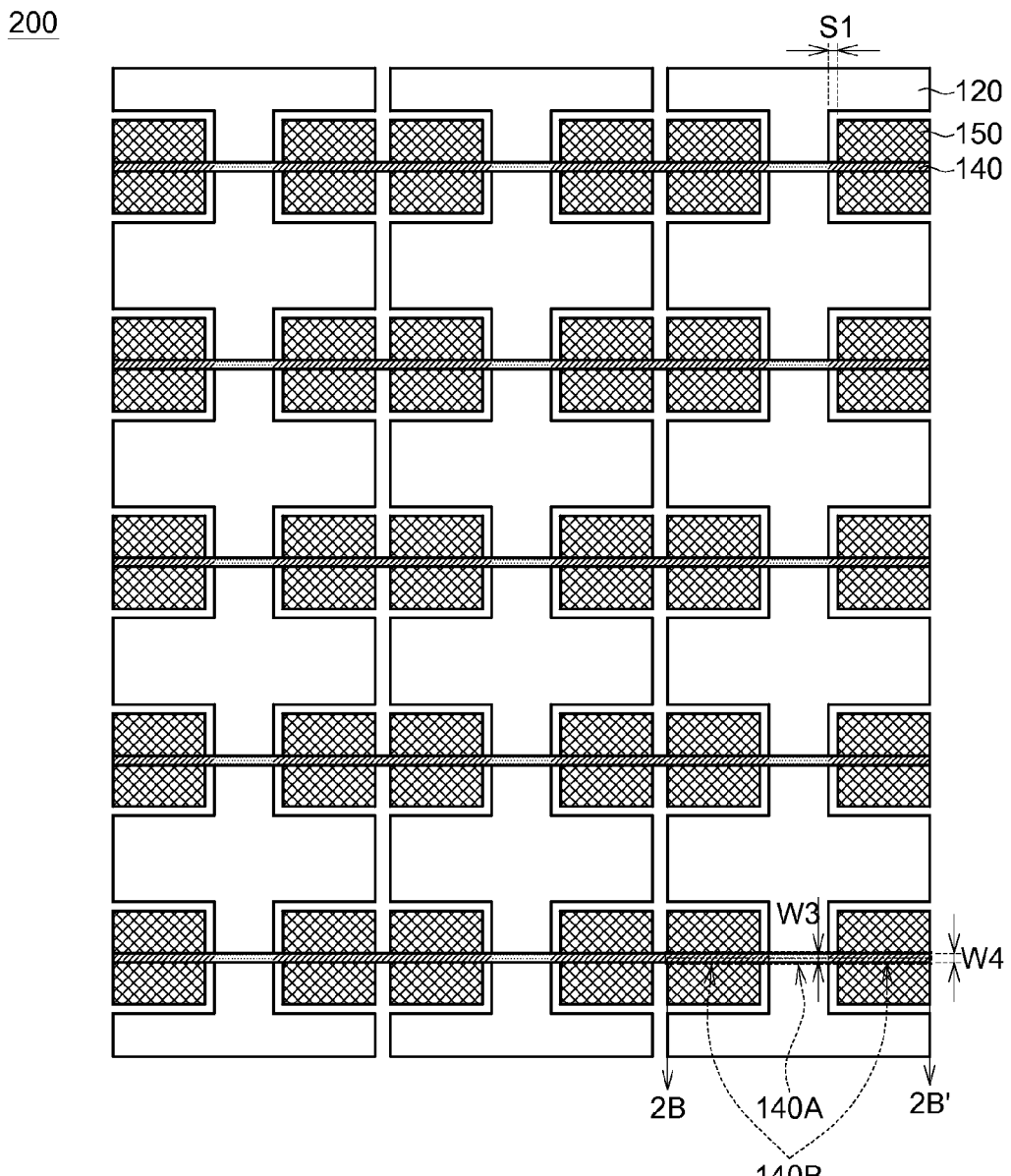
FIG. 2A is a top view of a touch device according to another embodiment of the present disclosure.
Figure 2B:
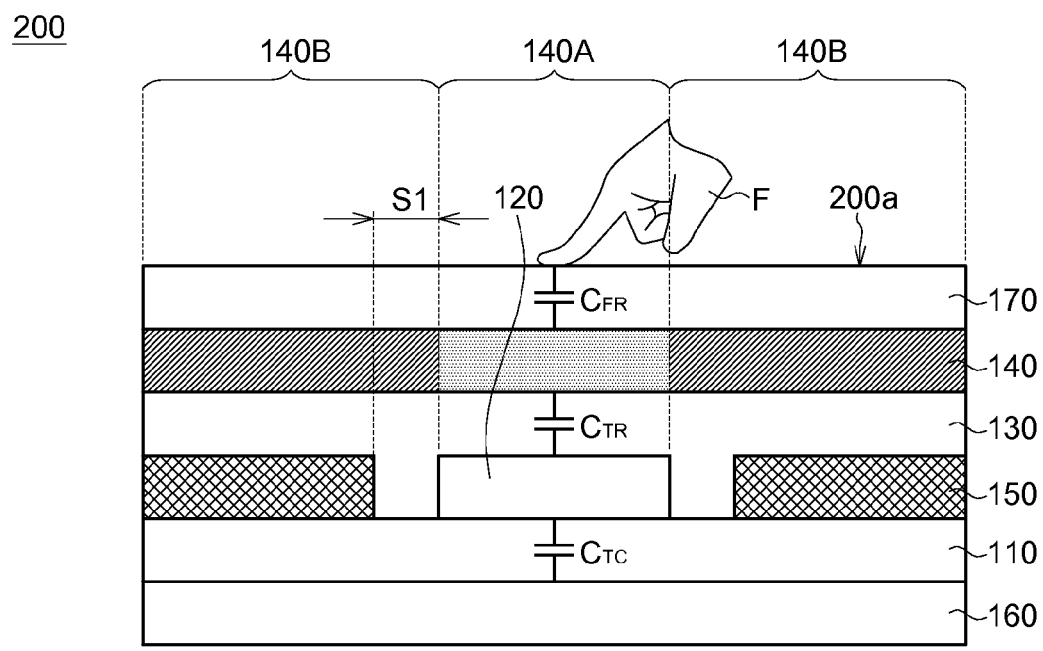
FIG. 2B is a cross-sectional view of the touch device of FIG. 2A along a cross-sectional line 2B-2B'.

FIG. 2A is a top view of a touch device 200 according to another embodiment of the present disclosure. FIG. 2B is a cross-sectional view of the touch device 200 of FIG. 2A along a cross-sectional line 2B-2B'. For elements identical or similar to those in the above embodiments, the same or similar reference numerals are used, and the descriptions thereof can be made with reference to above disclosure and are not repeated here.

In the embodiment as indicated in FIG. 2A, the first sensing electrode layer 120 and the second sensing electrode layer 140 both include a plurality of electrode strips. The electrode strips in the first sensing electrode layer 120 and the electrode strips in the second sensing electrode layer 140 are substantially orthogonal to each other to form a mesh structure.

In the embodiment as indicated in FIGS. 2A and 2B, the touch device 200 further includes a patterned conducting layer 150. The patterned conducting layer 150 is disposed on the first insulating layer 110 and coplanar with the first sensing electrode layer 120, and is further electrically insulated from the first sensing electrode layer 120 and the second sensing electrode layer 140. In other words, the patterned conducting layer 150 is not connected to any power end or signal end. In the embodiment, the patterned conducting layer 150 may include a transparent conductive material such as indium tin oxide (ITO).

Refer to FIG. 2B. When the finger F touches a surface 200a of the touch device 200, a sensing capacitance $C_{TC}$ is also generated between the first sensing electrode layer 120 (transmitter electrode) and the electrode layer 160 apart from the sensing capacitance $C_{FR}$ generated between the finger F and the second sensing electrode layer 140 (receiver electrode) and the sensing capacitance $C_{TR}$ generated between the first sensing electrode layer 120 (transmitter electrode) and the second sensing electrode layer 140 (receiver electrode). Then, the touch device 200 will have sensing signals $C_{FR}/(C_{TR}+C_{TC})$ and can operate smoothly.

According to the embodiments of the present disclosure, as indicated in FIG. 2B, the first sensing electrode layer 120 (transmitter electrode) and the second sensing electrode layer 140 (receiver electrode) are not coplanar, and the first sensing electrode layer 120 (transmitter electrode) and the patterned conducting layer 150 are disposed between the electrode layer 160 (the electrode layer of the display module) and the second sensing electrode layer 140 (receiver electrode) to avoid the second sensing electrode layer 140 (receiver electrode) and the electrode layer 160 (the electrode layer of the display module) from generating the sensing capacitance, so that only the first sensing electrode layer 120 (transmitter electrode) and the electrode layer 160 (the electrode layer of the display module) will generate the sensing capacitance $C_{TC}$. Therefore, even when the thickness 110t of the first insulating layer 110 is only 0.01-75 µm, the touch sensing signals will not be too weak to activate the touch sensing function, so that the touch sensitivity can be improved. In other words, according to the embodiment of the present disclosure, a thin and flexible touch device is provided while achieving excellent touch sensing effects.

In according to embodiment as indicated in FIGS. 2A and 2B, the patterned conducting layer 150 and the first sensing electrode layer 120 are separated by a spacing S1 of 100 nm-200 µm. In some embodiments, the spacing S1 does not necessarily have a fixed value. That is, the spacing S1 between the patterned conducting layer 150 and the first sensing electrode layer 120 can be narrower at some segments and wider at some other segments.

In according to embodiment as indicated in FIG. 2A, the pattern of the patterned conducting layer 150 may be complementary to the pattern of the first sensing electrode layer 120 and cover 80% or more than 80% of the area of the first insulating layer 110. For example, the patterned conducting layer 150 has a plurality of squared notches, the pattern of the first sensing electrode layer 120 includes a plurality of square blocks, and the square blocks are correspondingly disposed in the squared notches of the patterned conducting layer 150.

According to the embodiments of the present disclosure, as shown in FIG. 2A, the pattern of the patterned conducting layer 150 is complementary to the pattern of the first sensing electrode layer 120. That is, most part of the region, which is between the first insulating layer 110 and the second sensing electrode layer 140 and not filled up by the first sensing electrode layer 120, is filled up by the patterned conducting layer 150. Thus, the patterned conducting layer 150 when taken in conjunction with the first sensing electrode layer 120 not only benefits the thinning design and enables the flexible touch device 100 to maintain excellent touch sensing effect, but also provides optical compensation for improving the display effect. Let the touch device 100 be exemplified by a touch display device. The pattern of the patterned conducting layer 150 is complementary to the pattern of the first sensing electrode layer 120, so that the visual aberration and non-uniform optical distribution caused by the refraction of the light can be reduced on the display surface.

In the embodiment as indicated in FIGS. 2A and 2B, the second sensing electrode layer 140 may have a first region 140A and a second region 140B. The first region 140A overlaps the first sensing electrode layer 120, the second region 140B does not overlap the first sensing electrode layer 120, and the second region 140B overlaps the patterned conducting layer 150.

As indicated in FIG. 2B, a portion of the second insulating layer 130 is disposed between the first region 140A of the second sensing electrode layer 140 and the first sensing electrode layer 120, and the other portion of the second insulating layer 130 is disposed between the second region 140B of the second sensing electrode layer 140 and the patterned conducting layer 150. Moreover, the patterned conducting layer 150 and the first sensing electrode layer 120 are separated by a spacing S1, therefore a portion of the second region 140B of the second sensing electrode layer 140 corresponds to the spacing S1, and a portion of the second insulating layer 130 corresponding to the spacing S1 is disposed between the second region 140B of the second sensing electrode layer 140 and the first insulating layer 110.

In the embodiment as indicated in FIG. 2A, the width W3 of the first region 140A is substantially equivalent to the width W4 of the second region 140B. In the embodiment, the area of the second region 140B of the second sensing electrode layer 140, for example, is larger than the area of the first region 140A. In the present embodiment, the ratio of the total area of the first region 140A of the second sensing electrode layer 140 with respect to the area of the second region 140B is 1:10-1:50. In an embodiment, the ratio of the area of the first region 140A with respect to the area of the second region 140B, for example, is 1:30.

Figure 3A:
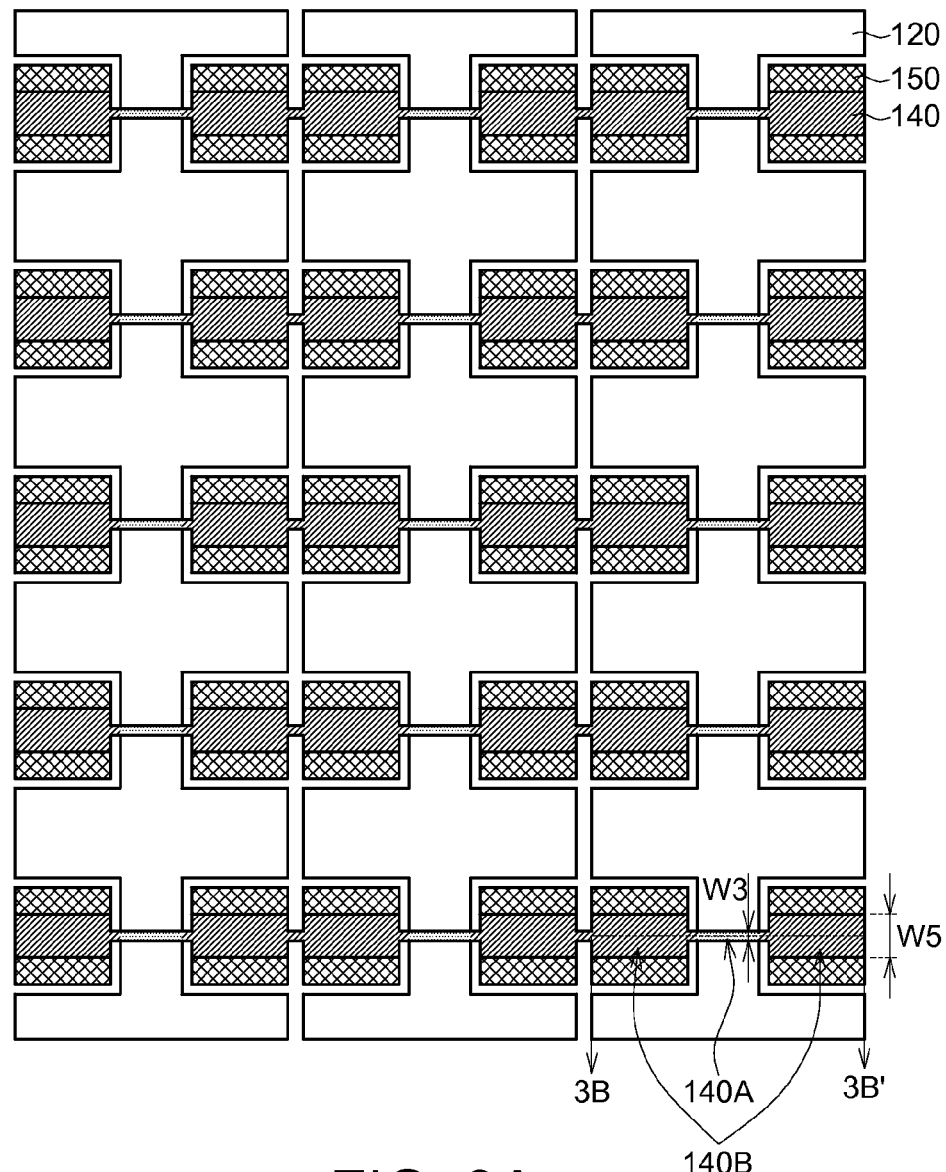
FIG. 3A is a top view of a touch device according to an alternate embodiment of the present disclosure.
Figure 3B:
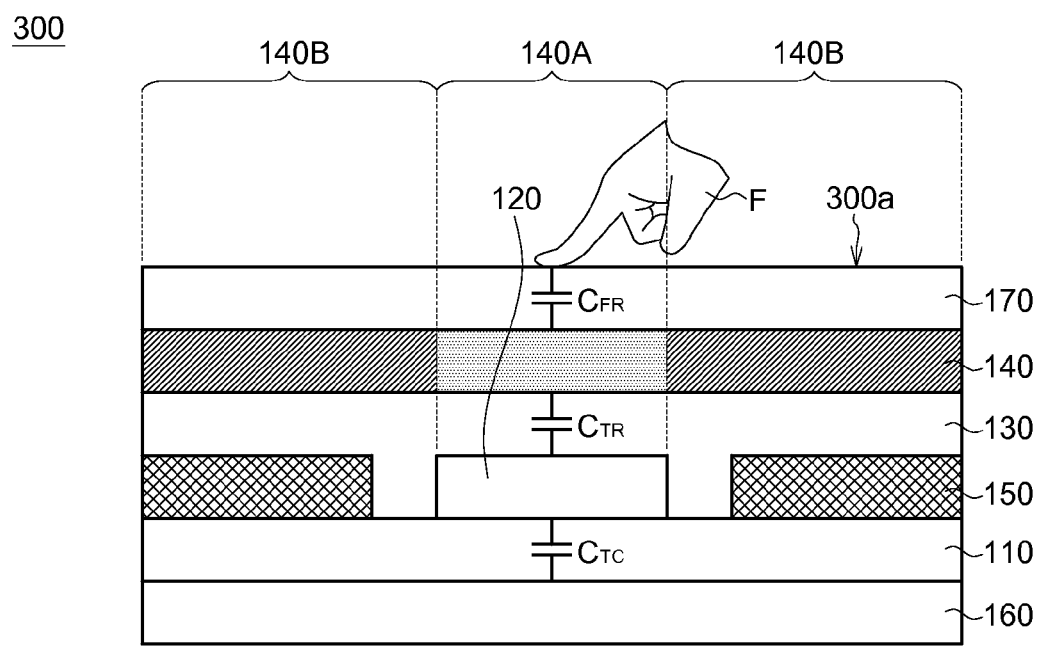
FIG. 3B is a cross-sectional view of the touch device of FIG. 3A along a cross-sectional line 3B-3B'.

FIG. 3A is a top view of a touch device according to an alternate embodiment of the present disclosure. FIG. 3B is a cross-sectional view of the touch device of FIG. 3A along a cross-sectional line 3B-3B'. For elements identical or similar to those in the above embodiments, the same or similar reference numerals are used, and the descriptions thereof can be made with reference to above disclosure and are not repeated here.

In the embodiment as indicated in FIGS. 3A and 3B, the second sensing electrode layer 140 of the touch device 300 may have a first region 140A and a second region 140B. The first region 140A overlaps the first sensing electrode layer 120, the second region 140B does not overlap the first sensing electrode layer 120, and the second region 140B overlaps the patterned conducting layer 150.

In the embodiment as indicated in FIG. 3A, the width W3 of the first region 140A, for example, is smaller than the width W5 of the second region 140B. In other words, the area of the second region 140B of the second sensing electrode layer 140 is such as larger than the area of the first region 140A. In the present embodiment, the ratio of the area of the first region 140A of the second sensing electrode layer 140 with respect to the area of the second region 140B is 1:10-1:50. In an embodiment, the ratio of the area of the first region 140A with respect to the area of the second region 140B is 1:30.

According to the embodiments of the present disclosure, when the width W3 of the first region 140A is relatively small or the area of the first region 140A is relatively small, the sensing capacitance $C_{TR}$ can also be relatively small. When the width W5 of the second region 140B is relatively large or the area of the second region 140B is relatively large, the sensing areas of the finger F and the second sensing electrode layer 140 will be relatively large, and the sensing capacitance $C_{FR}$ can also be relatively large. When the sensing capacitance $C_{TR}$ is relatively small and the sensing capacitance $C_{FR}$ is relatively large, the sensing signals $C_{FR}/(C_{TR}+C_{TC})$ of the touch device 300 can be increased to improve the touch sensitivity of the touch device 300.

Figure 4A:
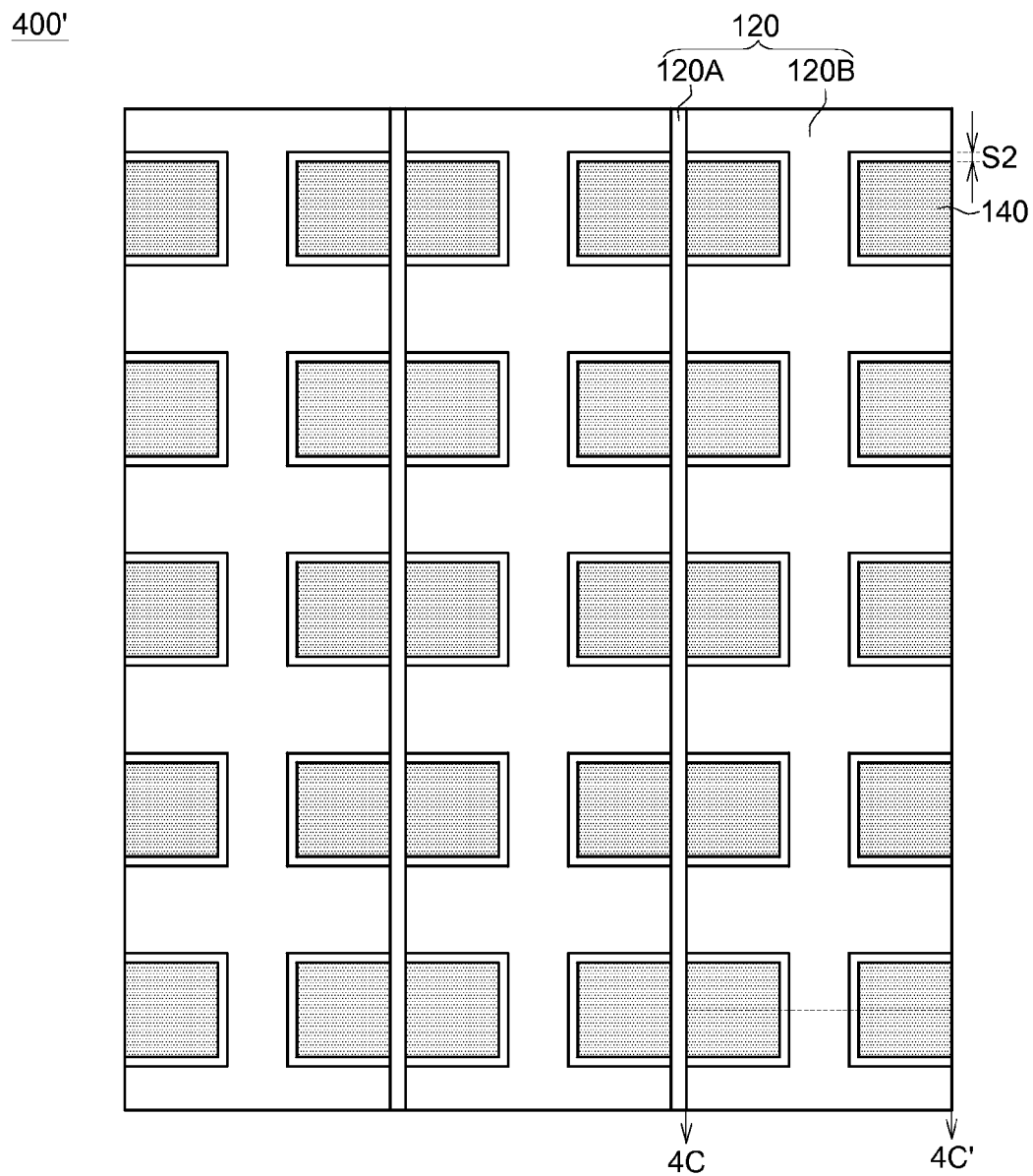
FIG. 4A is a top view of a touch device according to another alternate embodiment of the present disclosure.
Figure 4B:
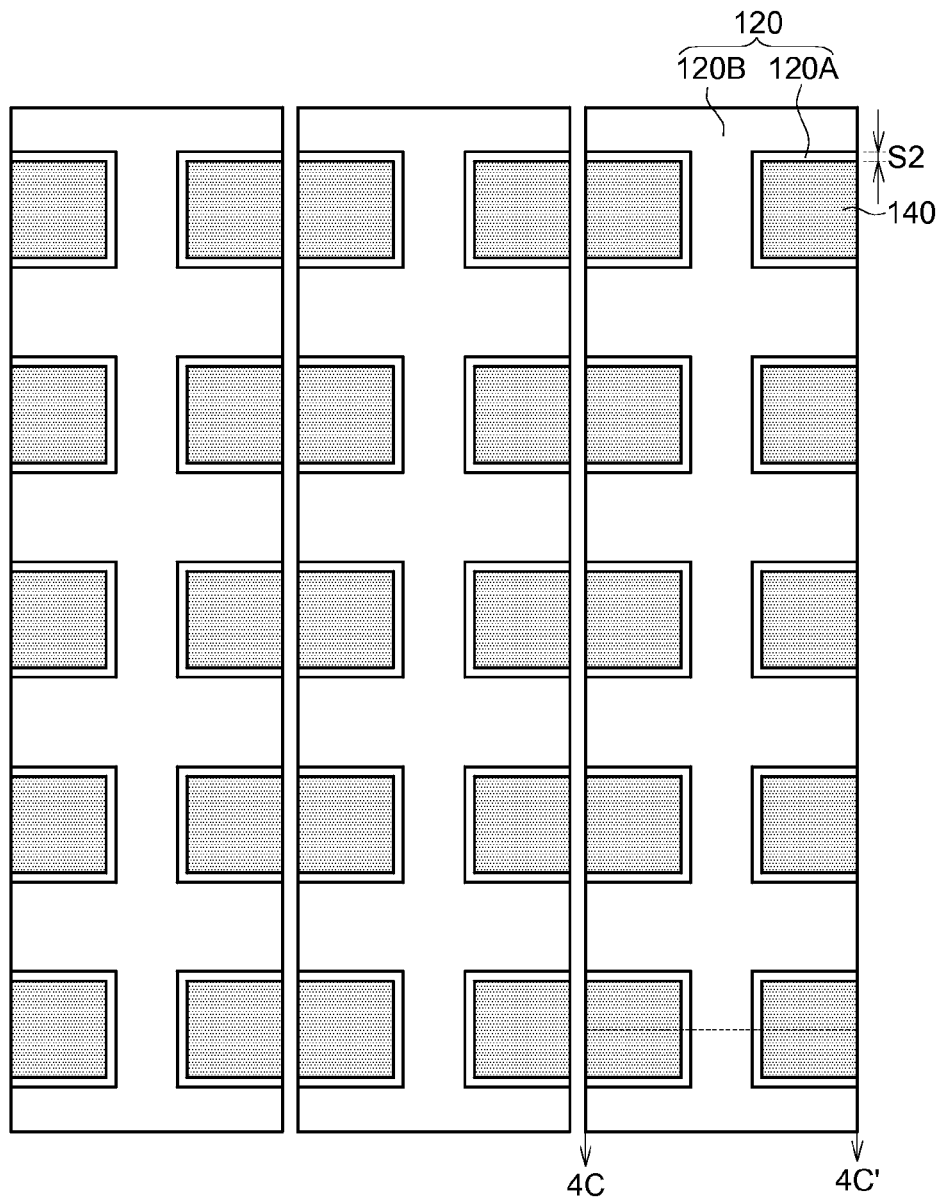
FIG. 4B is a top view of a touch device according to further another embodiment of the present disclosure.
Figure 4C:
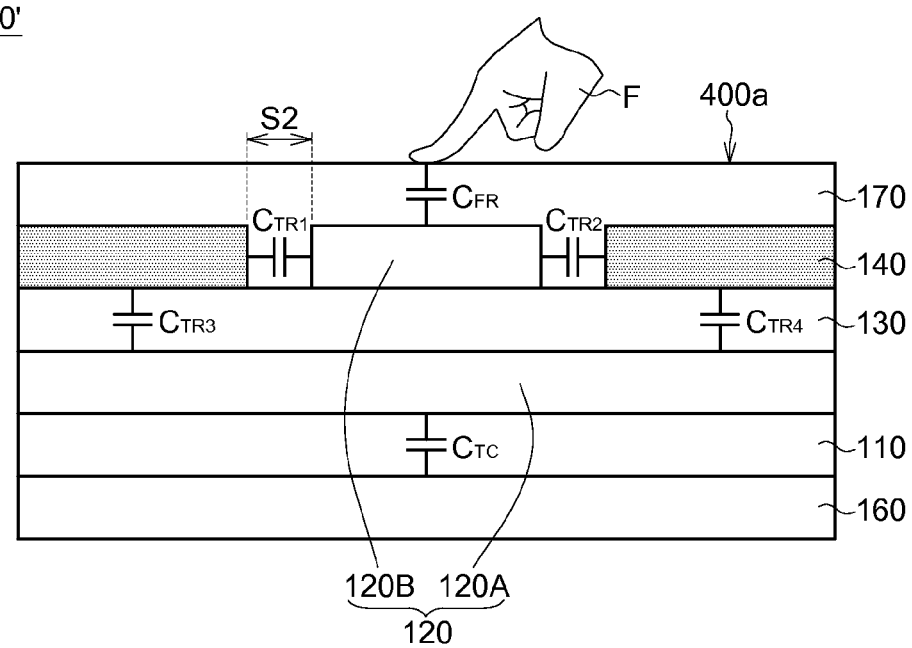
FIG. 4C is a cross-sectional view of the touch devices of FIG. 4A and FIG. 4B along a cross-sectional line 4C-4C'.

FIG. 4A is a top view of a touch device according to another alternate embodiment of the present disclosure. FIG. 4B is a top view of a touch device according to further another embodiment of the present disclosure. FIG. 4C is a cross-sectional view of the touch device of FIG. 4A and FIG. 4B along a cross-sectional line 4C-4C'. For elements identical or similar to those in the above embodiments, the same or similar reference numerals are used, and the descriptions thereof can be made with reference to above disclosure and are not repeated here.

In the embodiment as indicated in FIGS. 4A-4C, the touch device 400/400' includes a first insulating layer 110, a first sensing electrode layer 120, a second insulating layer 130 and a second sensing electrode layer 140. The first sensing electrode layer 120 includes a first portion 120A and a second portion 120B, wherein the first portion 120A is disposed on the first insulating layer 110. The second insulating layer 130 is disposed on the first portion 120A of the first sensing electrode layer 120. The second sensing electrode layer 140 is disposed on the second insulating layer 130 and coplanar with the second portion 120B of the first sensing electrode layer 120.

In the embodiment, the first portion 120A and the second portion 120B of the first sensing electrode layer 120 have a common potential. In some embodiments, the first portion 120A of the first sensing electrode layer 120, for example, is connected to and directly touches the second portion 120B. In some embodiments, the first portion 120A of the first sensing electrode layer 120 does not directly touch the second portion 120B, and the first portion 120A and the second portion 120B of the first sensing electrode layer 120 are separated by the second insulating layer 130.

In the embodiment as indicated in FIG. 4C, the touch device 400/400' further includes an electrode layer 160, the first portion 120A of the first sensing electrode layer 120 is disposed between the electrode layer 160 and the second sensing electrode layer 140, and the second sensing electrode layer 140 overlaps the first portion 120A of the first sensing electrode layer 120.

Refer to FIG. 4C. When the finger F touches a surface 400a of the touch device 400/400', apart from the sensing capacitance $C_{FR}$ generated between the finger F and the second sensing electrode layer 140 (receiver electrode) and the sensing capacitance $C_{TR}$ ($C_{TR1}$, $C_{TR2}$, $C_{TR3}$, $C_{TR4}$) generated between the first portion 120A and the second portion 120B (transmitter electrode) of the first sensing electrode layer 120 and the second sensing electrode layer 140 (receiver electrode), a sensing capacitance $C_{TC}$ is also generated between the first sensing electrode layer 120 (transmitter electrode) and the electrode layer 160. Then, the touch device 400/400' will have sensing signals $C_{FR}/(C_{TR}+C_{TC})$ and can operate smoothly.

According to the embodiments of the present disclosure, as indicated in FIG. 4C, the first portion 120A of the first sensing electrode layer 120 (transmitter electrode) is disposed between the electrode layer 160 (the electrode layer of the display module) and the second sensing electrode layer 140 (receiver electrode) to avoid the second sensing electrode layer 140 (receiver electrode) and the electrode layer 160 (the electrode layer of the display module) from generating a sensing capacitance, and only the first portion 120A of the first sensing electrode layer 120 (transmitter electrode) and the electrode layer 160 (the electrode layer of the display module) will generate the sensing capacitance $C_{TC}$. Therefore, even when the thickness 110t of the first insulating layer 110 is only 0.01-75 μm, the touch sensing signals will not be too weak to activate the touch sensing function. Moreover, without using any additional customized touch integrated circuit (IC), the intensity of the sensing signal can be increased to improve the touch sensitivity. In other words, according to the embodiments of the present disclosure, a thin and flexible touch device is provided while achieving excellent touch sensing effects.

In the embodiment as indicated in FIG. 4A-4C, the second sensing electrode layer 140 and the second portion 120B of the first sensing electrode layer 120 are separated by a spacing S2 of 100 nm-200 μm. In some embodiments, the spacing S2 does not necessarily have a fixed value. That is, the spacing S2 between the second sensing electrode layer 140 and the second portion 120B of the first sensing electrode layer 120 can be narrower at some segments and wider at some other segments.

In the embodiment as indicated in FIGS. 4A-4B, the pattern of the second sensing electrode layer 140 may be complementary to the pattern of the second portion 120B of the first sensing electrode layer 120 and cover 80% or more than 80% of the area of the second insulating layer 130. For example, the second portion 120B of the first sensing electrode layer 120 has a plurality of squared notches, the pattern of the second sensing electrode layer 140 includes a plurality of square blocks, and the square blocks are correspondingly disposed in the squared notches of the second portion 120B of the first sensing electrode layer 120. Such design not only maintains excellent touch sensing effect, but also provides optical compensation for improving the display effect and reduces the visual aberration on the display surface and non-uniform optical distribution caused by the refraction of the light.

In some embodiments, as indicated in FIG. 4A, the first portion 120A of the first sensing electrode layer 120 can be realized by a planar singular film. That is, the first portion 120A of the first sensing electrode layer 120 corresponds to a plurality of second portions 120B. Thus, the manufacturing process of the touch device of the present disclosure becomes more convenient.

In some embodiments as indicated in FIG. 4B, the first portion 120A of the first sensing electrode layer 120 includes a plurality of electrode strips, and the quantity of electrode strips in the first portion 120A is the same as that in the second portion 120B. That is, the first portion 120A of the first sensing electrode layer 120 corresponds to the second portion 120B. Thus, when the touch device 400 operates, the electrode strips in each group of corresponding first portion 120A and second portion 120B of the first sensing electrode layer 120 will emit signals at a predetermined frequency strip by strip, and the electrode strips in other groups of corresponding first portion 120A and second portion 120B will not emit signals, accordingly, unnecessary interference are not generated.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch device, comprising:
   a first insulating layer, wherein the first insulating layer has a thickness of 0.01-75 micrometers (μm);
   a first sensing electrode layer disposed on the first insulating layer, wherein the first sensing electrode layer is a transmitter electrode;
   a second insulating layer disposed on the first sensing electrode layer; and
   a second sensing electrode layer disposed on the second insulating layer, wherein the second sensing electrode layer is a receiver electrode, a thickness of the first sensing electrode layer is 20-200 nanometers (nm), and a thickness of the second sensing electrode layer is 20-200 nm.

2. The touch device according to claim 1, further comprising:
   an electrode layer, wherein the first insulating layer is disposed between the electrode layer and the first sensing electrode layer.

3. The touch device according to claim 2, wherein the electrode layer is a pixel electrode layer, a reference electrode, or an upper electrode layer of an organic light emitting diode (OLED) display module.

4. The touch device according to claim 1, wherein the second sensing electrode layer has a first region and a second region, the first region overlaps the first sensing electrode layer, and the second region does not overlap the first sensing electrode layer.

5. The touch device according to claim 4, wherein a ratio of an area of the first region of the second sensing electrode layer with respect to a total area of the first region and the second region of the second sensing electrode layer is 90-99.5%.

6. The touch device according to claim 1, further comprising:
   a patterned conducting layer disposed on the first insulating layer and coplanar with the first sensing electrode layer, wherein the patterned conducting layer is electrically insulated from the first sensing electrode layer and the second sensing electrode layer.

7. The touch device according to claim 6, wherein the patterned conducting layer and the first sensing electrode layer are separated by a spacing of 100 nm-200 μm.

8. The touch device according to claim 6, wherein a pattern of the patterned conducting layer is complementary to a pattern of the first sensing electrode layer and covers 80% or more than 80% of an area of the first insulating layer.

9. The touch device according to claim 6, wherein the second sensing electrode layer has a first region and a second region, the first region overlaps the first sensing electrode layer, the second region does not overlap the first sensing electrode layer, and the second region overlaps the patterned conducting layer.

10. The touch device according to claim 9, wherein a width of the first region of the second sensing electrode layer is smaller than a width of the second region of the second sensing electrode layer.

11. The touch device according to claim 1, wherein the first insulating layer comprises:
    an insulating protection layer; and
    an adhering layer disposed on the insulating protection layer.

* * * * *